(12) United States Patent
Burnsed et al.

(10) Patent No.: US 12,551,002 B2
(45) Date of Patent: Feb. 17, 2026

(54) ACCESSORY ADAPTER

(71) Applicant: Blue Force Gear, Inc., Pooler, GA (US)

(72) Inventors: Ashley A. Burnsed, Savannah, GA (US); Stephen G. Hilliard, Cainhoy, SC (US)

(73) Assignee: Blue Force Gear, Inc., Pooler, GA (US)

( * ) Notice: Subject to any disclaimer, the term of this patent is extended or adjusted under 35 U.S.C. 154(b) by 177 days.

(21) Appl. No.: 18/461,329

(22) Filed: Sep. 5, 2023

(65) Prior Publication Data

US 2024/0074568 A1 Mar. 7, 2024

Related U.S. Application Data

(60) Provisional application No. 63/403,585, filed on Sep. 2, 2022.

(51) Int. Cl.
*A45F 5/02* (2006.01)

(52) U.S. Cl.
CPC ........ *A45F 5/021* (2013.01); *A45F 2005/025* (2013.01)

(58) Field of Classification Search
CPC ................ A45F 5/021; A45F 2005/025; A45F 2005/027; A45F 5/1566; F16B 35/06; F41C 33/045
See application file for complete search history.

(56) References Cited

U.S. PATENT DOCUMENTS

| | | | | |
|---|---|---|---|---|
| 3,803,667 A | * | 4/1974 | Rose | A61B 17/1604 81/439 |
| 4,339,179 A | * | 7/1982 | Dany | F16B 39/282 351/90 |
| 5,421,497 A | * | 6/1995 | Gilmore | F41C 33/045 224/198 |
| 6,772,927 B2 | * | 8/2004 | Bogoslofski | B60R 9/10 211/20 |
| 7,320,420 B2 | * | 1/2008 | Buis | F41C 33/043 224/192 |
| 7,331,872 B1 | * | 2/2008 | Parsons | A45F 5/02 224/195 |

(Continued)

*Primary Examiner* — Adam J Waggenspack
(74) *Attorney, Agent, or Firm* — Eversheds Sutherland (US) LLP (57) ABSTRACT

An adapter for attaching an accessory is provided. The adapter includes a wearable component mounting portion and an accessory mounting platform. The accessory mounting platform includes a first aperture at a first end of the accessory mounting platform, the first aperture being configured to receive a first fastener. The accessory mounting platform further includes a second aperture at the first end of the accessory mounting platform and spaced from the first aperture along a first axis, the second aperture being configured to receive a second fastener. The accessory mounting platform further includes a third aperture at a second end of the accessory mounting platform, the third aperture configured to receive a third fastener. The first aperture, the second aperture, and the third aperture are shaped to enable mounting of a accessory at a plurality of cant angles along a second axis, the second axis being perpendicular to the first axis.

20 Claims, 10 Drawing Sheets

(56) References Cited

U.S. PATENT DOCUMENTS

| | | | |
|---|---|---|---|
| 7,866,515 B1 * | 1/2011 | Buis, III | F41C 33/041 |
| | | | 224/198 |
| 11,470,951 B1 * | 10/2022 | Heanssler | A45F 5/021 |
| 11,781,831 B2 * | 10/2023 | Smith | F41C 33/0263 |
| | | | 224/191 |

* cited by examiner

ACCESSORY ADAPTER

RELATED APPLICATION

Under provisions of 35 U.S.C. § 119(e), Applicant claims the benefit of U.S. Provisional Application No. 63/403,585, filed Sep. 2, 2022, which is incorporated herein by reference.

TECHNICAL FIELD

The present disclosure relates generally to firearms, and more particularly to a accessory adapter.

BACKGROUND

A holster is a device used to hold or restrict the undesired movement of implements (for example, a handgun), most commonly in a location where it can be easily withdrawn for immediate use. Holsters are generally designed to offer protection to the handgun, secure its retention, and provide ready access to it. The need for ready access is often at odds with the need for security and protection. Choosing the right balance can be very important where failure to access weapon quickly or damage or loss of the weapon because of the insufficient retention or protection can result in serious injury or death to the user. Individuals strive to optimize control and utilization of the handgun.

SUMMARY OF THE INVENTION

In accordance with example embodiments of the disclosure, an adapter for attaching an accessory is provided. The adapter comprises a wearable component mounting portion having a plurality of apertures configured to receive a plurality of fasteners to attach the adapter to a wearable component. The adapter further comprises an accessory mounting platform having a first aperture at a first end of the accessory mounting platform, the first aperture being configured to receive a first fastener. The accessory mounting platform further includes a second aperture at the first end of the accessory mounting platform and spaced from the first aperture along a first axis, the second aperture configured to receive a second fastener. The accessory mounting platform further includes a third aperture at a second end of the accessory mounting platform, the third aperture configured to receive a third fastener. The first aperture, the second aperture, and the third aperture are shaped to enable mounting of an accessory at a plurality of cant angles along a second axis, the second axis being perpendicular to the first axis.

In accordance with example embodiments of the disclosure, an adapter for attaching an accessory comprises a wearable component mounting portion and an accessory mounting platform spaced from the wearable component. The accessory mounting platform includes a first elongated aperture at a first end of the accessory mounting platform, the first elongated aperture being configured to receive a first fastener. The accessory mounting platform further includes a second elongated aperture at the first end of the accessory mounting platform and spaced from the first elongated aperture along a first axis, the second elongated aperture configured to receive a second fastener. The accessory mounting platform further includes a third elongated aperture at a second end of the accessory mounting platform, the third elongated aperture configured to receive a third fastener. The first elongated aperture, the second elongated aperture, and the third elongated aperture are shaped to enable mounting of an accessory at a plurality of cant angles from a second axis, the second axis being perpendicular to the first axis. The mounting of an accessory at a plurality of cant angles facilitates a user to micro adjust the accessory settings for preferred use.

In accordance with example embodiments of the disclosure a method of mounting an accessory to a wearable component includes positioning a first fastener through an accessory into a first aperture of an accessory mounting platform of an adapter, the first aperture being located at a first end of the accessory mounting platform. The method further includes positioning a second fastener through the accessory into a second aperture of the accessory mounting platform, the second aperture being located at the first end of the accessory mounting platform and spaced from the first aperture along a first axis. The method further includes positioning a third fastener through the accessory into a third aperture of the accessory mounting platform, the third aperture being located at a second end of the accessory mounting platform. The method further includes determining a cant angle for mounting of the accessory and rotating the first fastener, the second fastener, and the third fastener along an arc around a second axis to orient the accessory to the cant angle, the second axis being perpendicular to the first axis. The method further includes tightening the first fastener, the second fastener, and the third fastener.

BRIEF DESCRIPTION OF THE DRAWINGS

The accompanying drawings, which are incorporated in and constitute a part of this disclosure, illustrate various embodiments of the present disclosure. In the drawings.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The disclosure provides an adapter that is designed to position an accessory, for example, a holster, a magazine pouch, a breaching tool holder, a shot gun magnet, a flashlight holder, etc., below a natural belt line of a user. The adapter uses a four-screw mounting interface that corresponds to and is compatible with spacings and dimensions of mounting slots or MOLLE holes on a wearable component (for example, a belt). Apertures of the mounting interface have notches that correspond to and mate up with notches on fastener heads itself to provide a counter-rotation effect for tightening the fasteners. The disclosed adapter has provisions to rotate the accessory through a 30-degree arc for an optimal draw angle and includes positional slots that are shaped to prevent rotational slippage once positioned. The adapter also includes embossed markings along the arc showing degrees of deflection off of zero, fore and aft up to 30 degrees in either direction.

Figure 1:
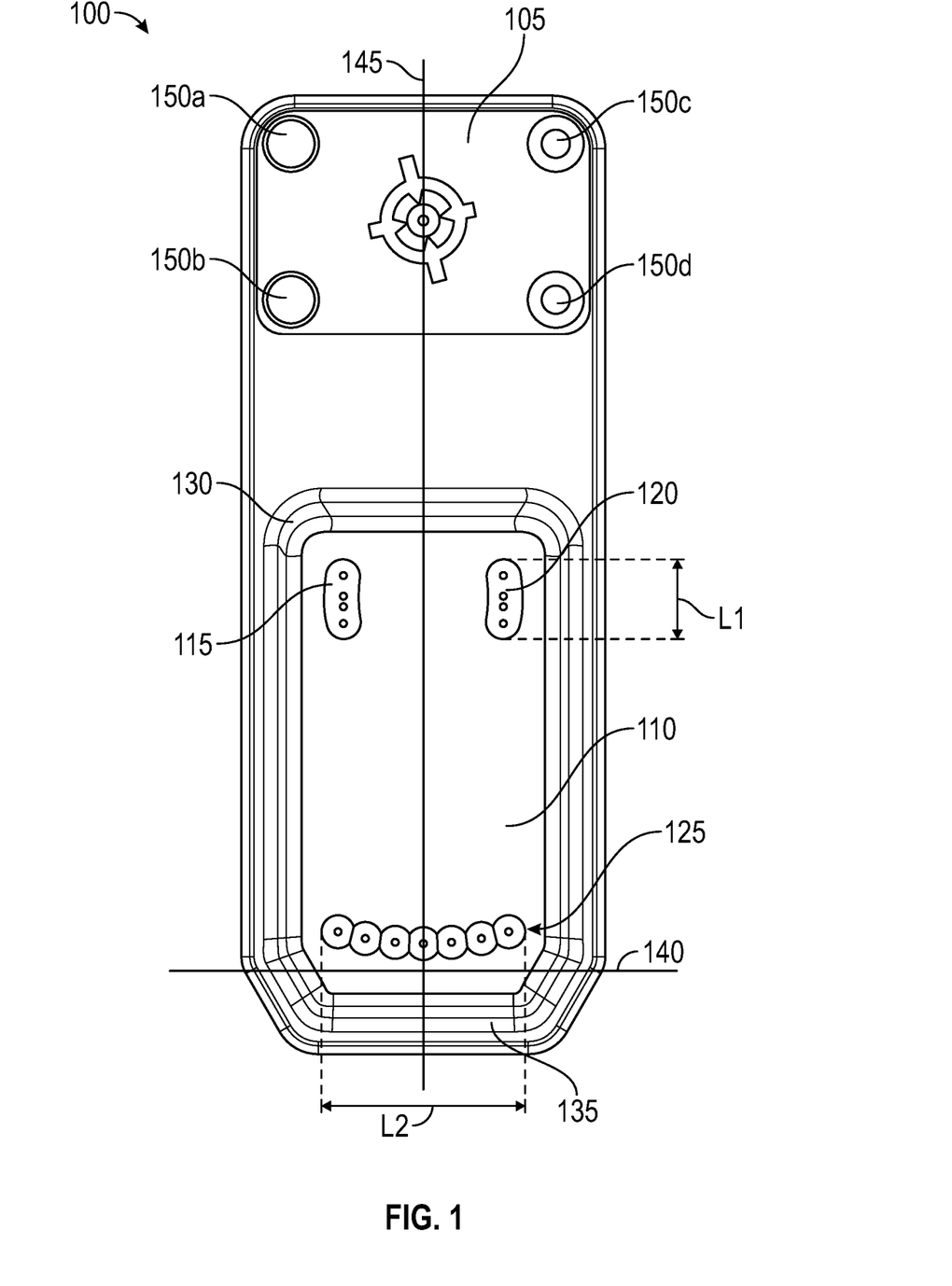
FIG. 1 is a diagram of an adapter.

FIG. 1 is a diagram of an adapter 100. As shown in FIG. 1, adapter 100 includes a wearable component mounting portion 105 and an accessory mounting platform 110. Wearable component mounting portion 105 is located at a first end of adapter 100 and accessory mounting platform 110 is located at a second end of adapter 100, the second end being opposite to the first end. Thus, accessory mounting platform 110 is spaced from wearable component mounting portion 105, and by extension a belt line of a bearer.

Accessory mounting platform 110 is raised, protrudes from, or elevated from wearable component mounting portion 105. Accessory mounting platform 110, therefore, may also be referred to as a spacer as it provides a separation between bearer's body and the accessory. This separation may prevent rubbing of fasteners used for mounting an accessory to adapter 100 against bearer's skin thereby increasing bearer's comfort level. A height of accessory mounting platform 110 from wearable component mounting portion 105 may be fixed or adjustable.

Accessory mounting platform 110 includes a three-aperture pattern for mounting an accessory. The three-aperture pattern includes a first aperture 115, a second aperture 120, and a third aperture 125. First aperture 115 and second aperture 120 are located at a first end 130 of accessory mounting platform 110 while third aperture 125 is located at a second end 135 of accessory mounting platform 110. Second aperture 120 may be spaced from first aperture 115 along a first axis 140. Third aperture 125 may be spaced from both first aperture 115 and second aperture 120 along a second axis 145. Second axis 145 is perpendicular to first axis 140.

Each of first aperture 115, second aperture 120, third aperture 125 are elongated apertures. Each of first aperture 115 and second aperture 120 is elongated along second axis 145 while third aperture 125 is elongated along first axis 140. A length L1 of each of first aperture 115 and second aperture 120 may be in a range of 0.25" to 0.75". A length L2 of each of third aperture 125 may be in a range of 1.25" to 1.75". Other lengths are possible for each of first aperture 115, second aperture 120, third aperture 125.

Third aperture 125 includes a plurality of positional slots. Each of the plurality of positional slots of third aperture 125 may provide an incremental cant angle from second axis 145 in both directions along first axis 140. For example, each of the plurality of positional slots of third aperture 125 may provide an incremental cant angle of 5 degrees from second axis 145 up to 15 degrees in both directions along first axis 140. Each of the plurality of positional slots may be marked with the cant angle relative to second axis 145 and are shaped to prevent rotational slippage once fasteners are positioned. Elongated structure of first aperture 115, second aperture 120, third aperture 125 allows movement of fasteners along an arc providing different cant angles for an accessory.

Wearable component mounting portion 105 includes a plurality of apertures, for example, a first aperture 150a, a second aperture 150b, a third aperture 150c, and a fourth aperture 150d. A first spacing between first aperture 150a and second aperture 150b and a second spacing between first aperture 150a and third aperture 150c may correspond to and be compatible with aperture spacing on a wearable component (for example, a belt) on which adapter 100 is to be mounted.

Figure 2:
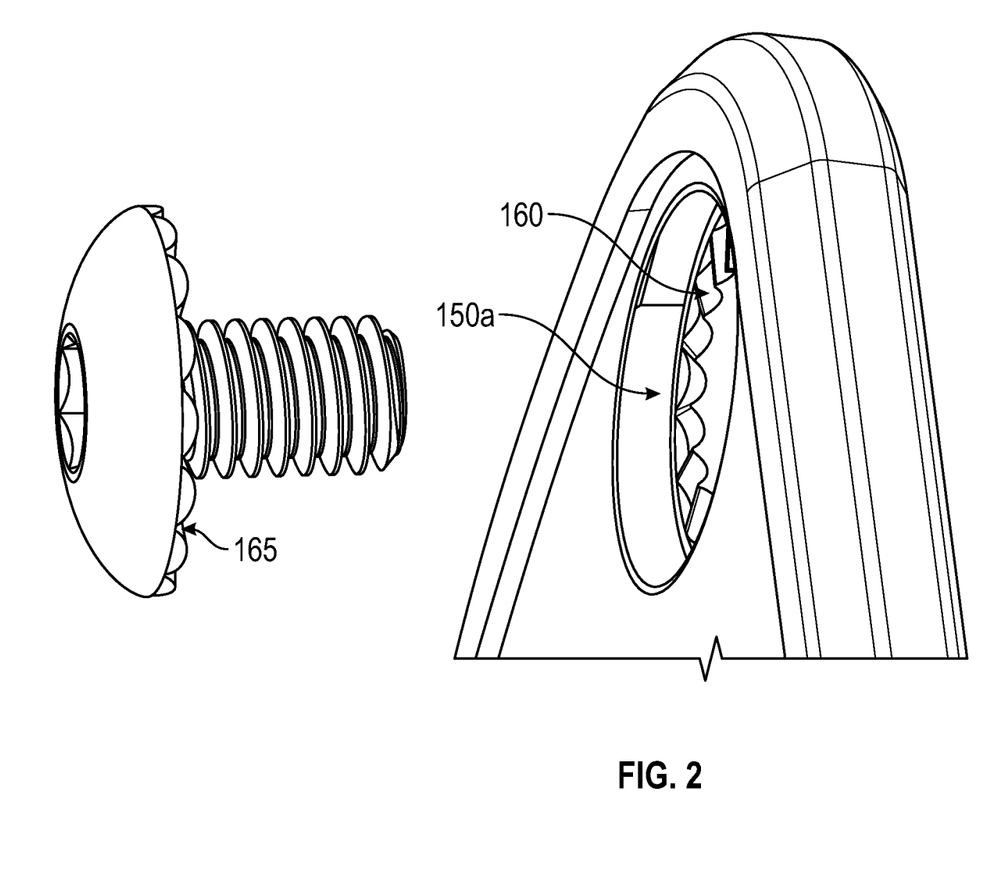
FIG. 2 is a diagram of an aperture of the adapter of FIG. 1.

In accordance with example embodiments, each of first aperture 150a, second aperture 150b, third aperture 150c, and fourth aperture 150d may include notches that may correspond to and mate up with notches on a fastener head to provide a counter-rotation effect for tightening the fastener. FIG. 2 is a diagram of first aperture 150a of wearable component mounting portion 105 of adapter 100. As shown in FIG. 2, first aperture 150a includes aperture notches 160. Aperture notches 160 may correspond to and mate up with fastener notches 165 on a fastener head to provide a counter-rotation effect for tightening the fastener.

Figure 3A:
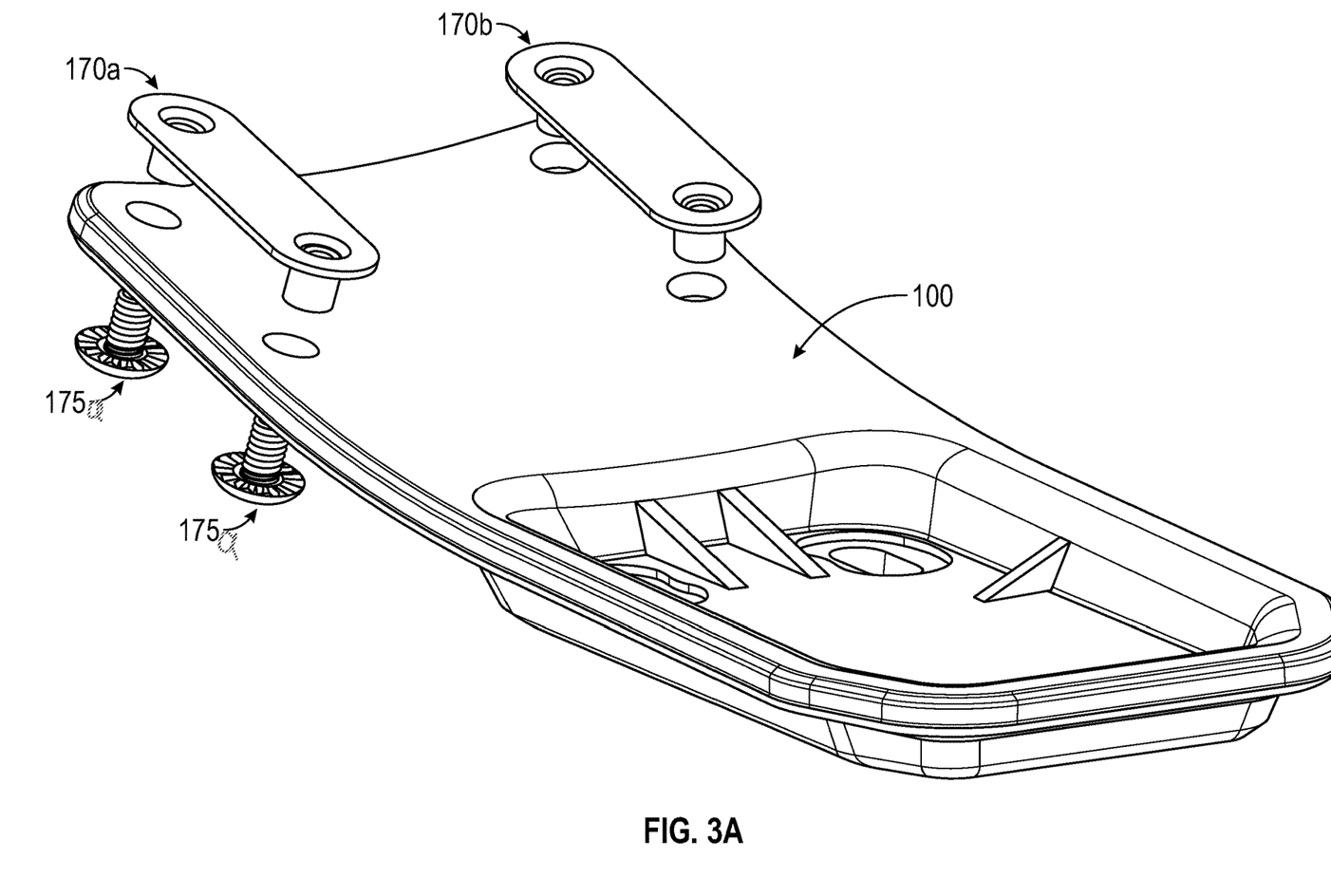
FIG. 3A and FIG. 3B are diagrams illustrating an example securing mechanism for mounting the adapter of FIG. 1 to a wearable component.
Figure 3B:
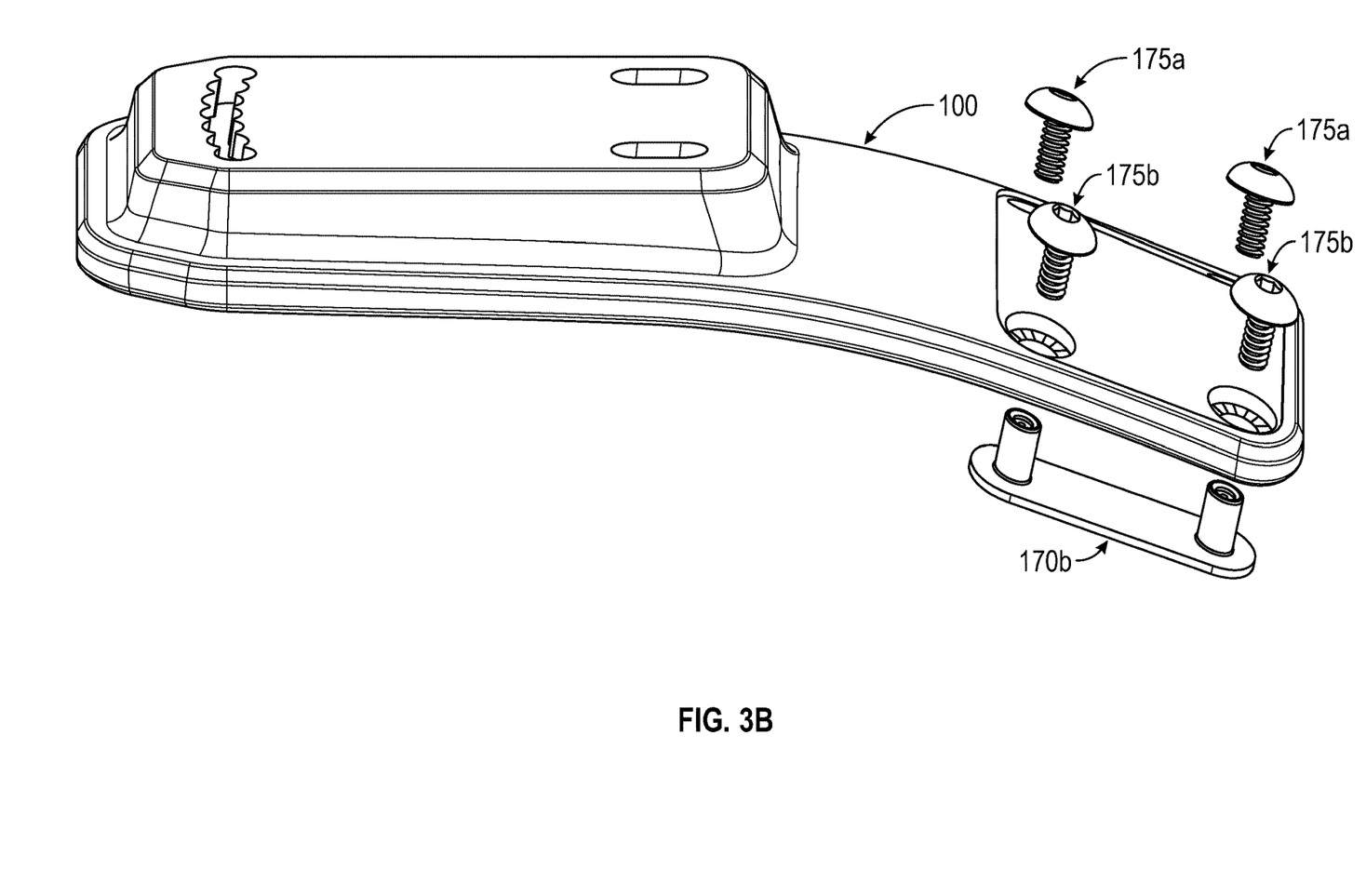

FIG. 3A and FIG. 3B are diagrams illustrating an example securing mechanism for mounting adapter 100 to a wearable component. As shown in FIG. 3A and FIG. 3B, the securing mechanism includes a plurality of bars with two female apertures, for example, a first bar 170a and a second bar 170b. First bar 170a includes two female apertures to receive two screw 175a. Similarly, second bar 170b includes two female apertures to receive two screws 175b. A distance between the two female apertures on each of first bar 170a and second bar 170b may correspond to the aperture spacing on a wearable component on which adapter 100 is to be mounted. In some examples, the securing mechanism may be molded (for example, injection molded) into adapter 100 and may allow a user to ratchet down the screws to ensure a secure fitment that will stay secured. Other types of securing mechanism are contemplated and may be used to mount adapter 100 to a wearable component.

Figure 4:
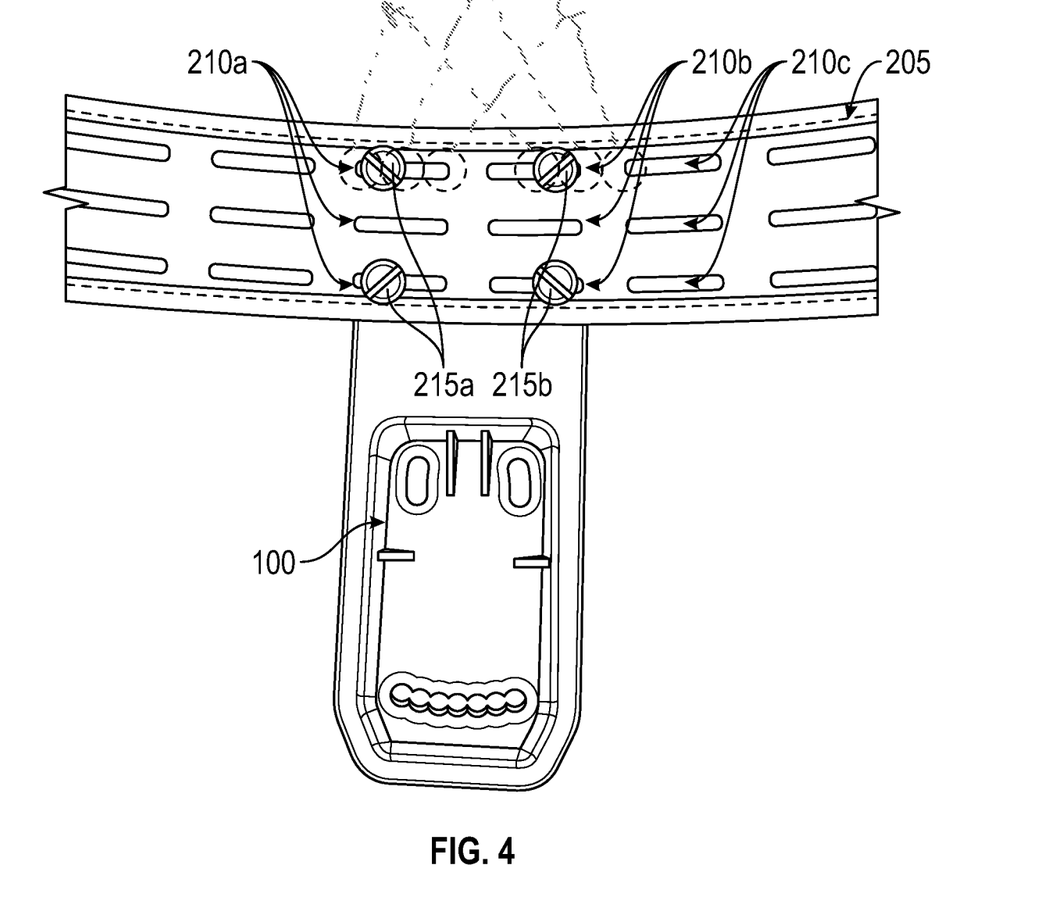
FIG. 4 illustrates the adapter of FIG. 1 mounted on a wearable component.

FIG. 4 illustrates adapter 100 being mounted on a wearable component (for example, a belt 205) over a range of positions. Belt 205 may include a plurality of slots, for example, first slots 210a, second slots 210b, and third slots 210c. As shown in FIG. 4, at a position A, left fasteners 215a are at a left limit of first slots 210a and right fasteners 215b are at an intermediate position on second slots 210b. In a position B, right fasteners 215b have reached a right end of second slot 210b and left fasteners 215a are at an intermediate position in first slots 210a. If adapter 100 is desired to be moved farther to the right, there is a dead zone in which it cannot be attached, until right fasteners 215b have reached a left end of third slots 210c. In this position C, left fasteners 215a and right fasteners 215b are in first slots 210a that are separated by an empty second slots 210b, while on other positions they are in adjacent slots. Beyond position C, left fasteners 215 may be disconnected for another dead zone, until it is at a left end of second slots 210b, corresponding to position A, shifted by one slot. Thus, adapter 100 may enable position adjustments without total detachment, as all adjustments may be done with removing only one fastener at a time, keeping gear from dropping off belt 205 and the position being lost.

FIG. 5A, FIG. 5B, FIG. 5C, FIG. 5D, FIG. 5E, FIG. 5F, and FIG. 5G illustrate different positions of fasteners for mounting a accessory to adapter 100. For example, a first fastener 225 is positioned or received in first aperture 115 of accessory mounting platform 110, a second fastener 230 is positioned or received in second aperture 120 of accessory mounting platform 110, and a third fastener 235 is positioned or received in third aperture 125 of accessory mounting platform 110. Elongated shapes of first aperture 115, second aperture 120, and third aperture 125 allows movement of first fastener 225, second fastener 230, and third faster 235 in respective apertures along respective axes. Movement of first fastener 225, second fastener 230, and third faster 235 in respective apertures along respective axes may allow for adjustment of a cant angle for the accessory without having to completely unmount the accessory from adapter 100.

Figures 5A, 5B:
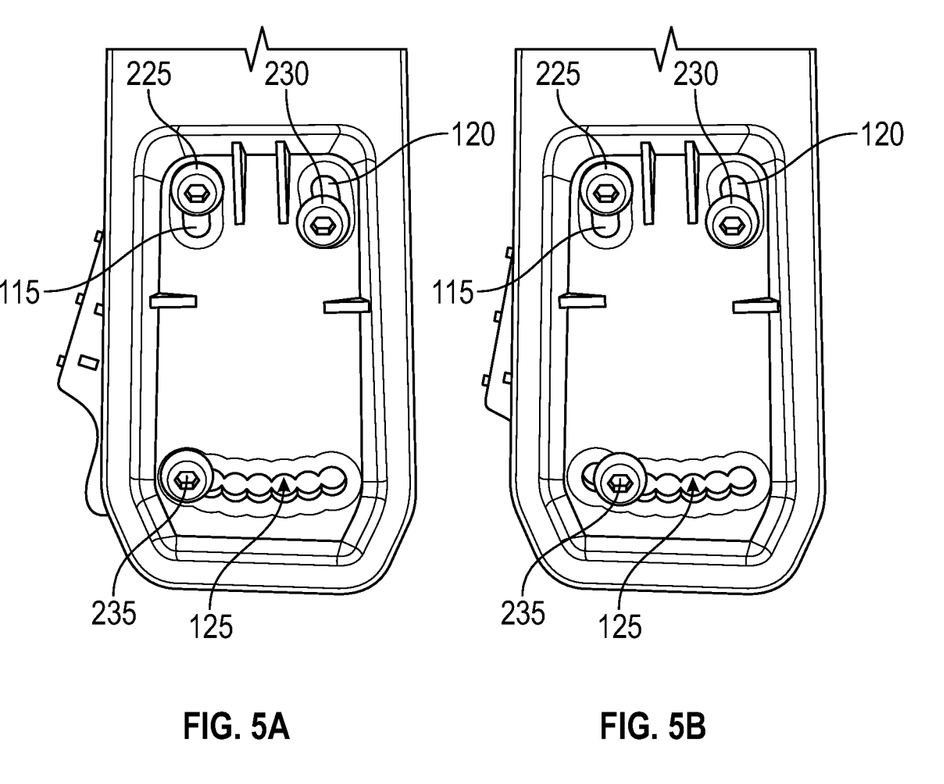
FIG. 5A, FIG. 5B, FIG. 5C, FIG. 5D, FIG. 5E, FIG. 5F, and FIG. 5G illustrate different positions of fasteners for mounting an accessory to the adapter of FIG. 1.

FIG. 5A illustrates a first configuration of the fasteners that provides a first cant angle for the accessory. The first cant angle is three incremental angles from second axis 145 in a counterclockwise direction (for example, −15 degrees). In the first configuration, third fastener 235 is at three positional slots away from second axis 145 in the counterclockwise direction. In addition, in the first configuration, first fastener 225 is positioned at the topmost point of first aperture 115 and second fastener 230 is positioned at the lowest point of second aperture 120.

FIG. 5B illustrates a second configuration for the fasteners that provides a second cant angle. The second cant angle is a two incremental angles from second axis 145 in the counterclockwise direction (for example, −10 degrees). In the second configuration, third fastener 235 is at two positional slots away from second axis 145 in the counterclockwise direction. In addition, in the second configuration, first fastener 225 is positioned towards first axis 140 from the topmost position in first aperture 115 and second fastener 230 is positioned towards first axis 140 from the lowest point in second aperture 120.

Figures 5C, 5D:
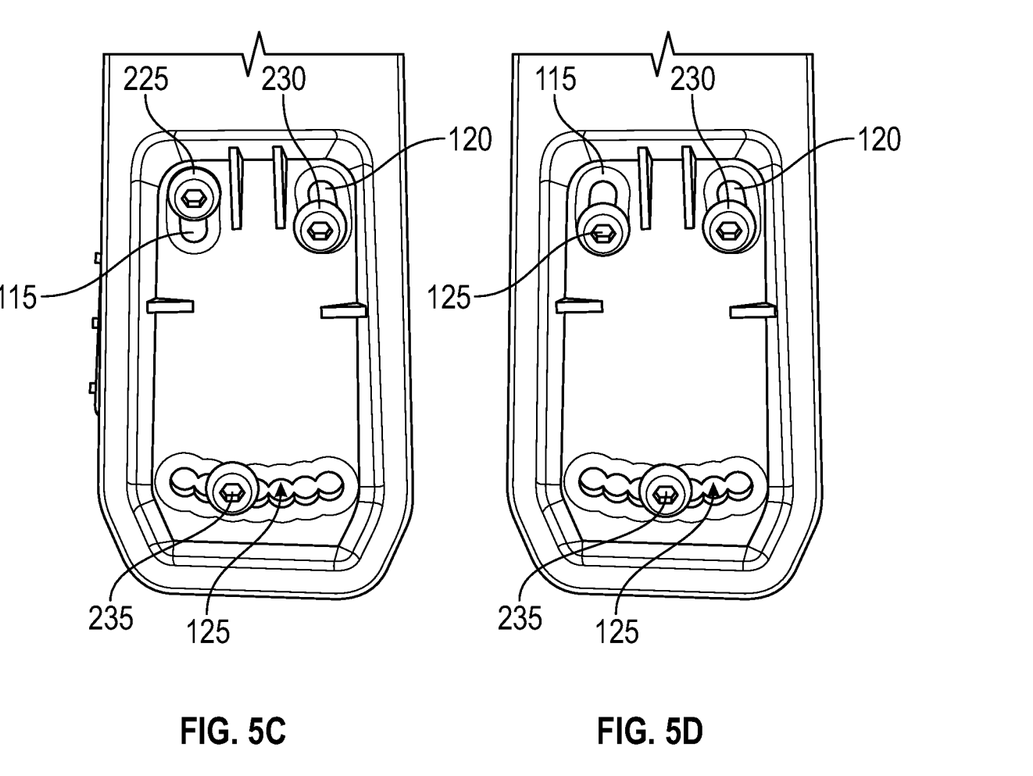

FIG. 5C illustrates a third configuration for the fasteners that provides a third cant angle. The second third cant angle is a one incremental angle from second axis 145 in the counterclockwise direction (for example, −5 degrees). In the third configuration, third fastener 235 is at one positional slot away from second axis 145 in the counterclockwise direction. In addition, in the third configuration, first fastener 225 is positioned further towards first axis 140 from the topmost position in first aperture 115 and second fastener 230 is positioned further towards first axis 140 from the lowest point in second aperture 120.

FIG. 5D illustrates a fourth configuration for the fasteners that provides a fourth cant angle. The fourth cant angle is aligned with second axis 145 (for example, 0 degrees). In the fourth configuration, third fastener 235 is aligned with second axis 145. In addition, in the fourth configuration, both first fastener 225 and second fastener 230 are aligned with first axis 140.

Figure 5E:
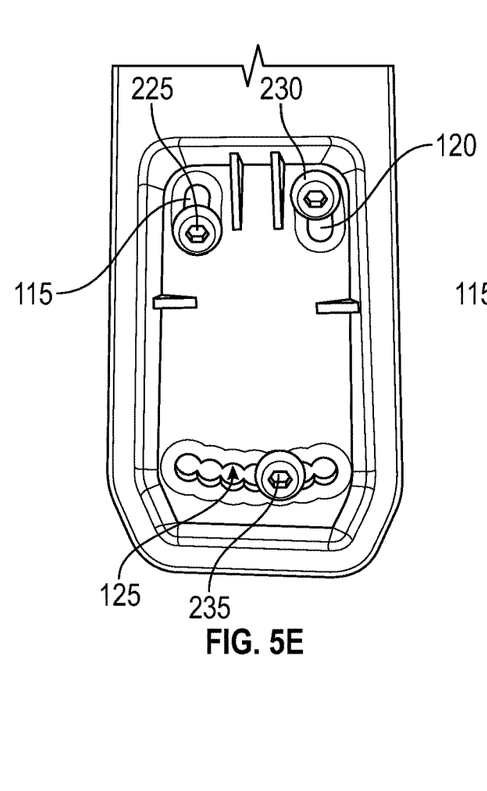

FIG. 5E illustrates a fifth configuration for the fasteners that provides a fifth cant angle. The fifth cant angle is one incremental angle from second axis 145 in a clockwise direction (for example, +5 degrees). In the fifth configuration, third fastener 235 is at one positional slot away from second axis 145 in the clockwise direction. In addition, in the fifth configuration, first fastener 225 is positioned away from first axis 140 towards the lowest point in first aperture 115 and second fastener 230 is positioned away from first axis 140 towards the top most point in second aperture 120.

Figure 5F:
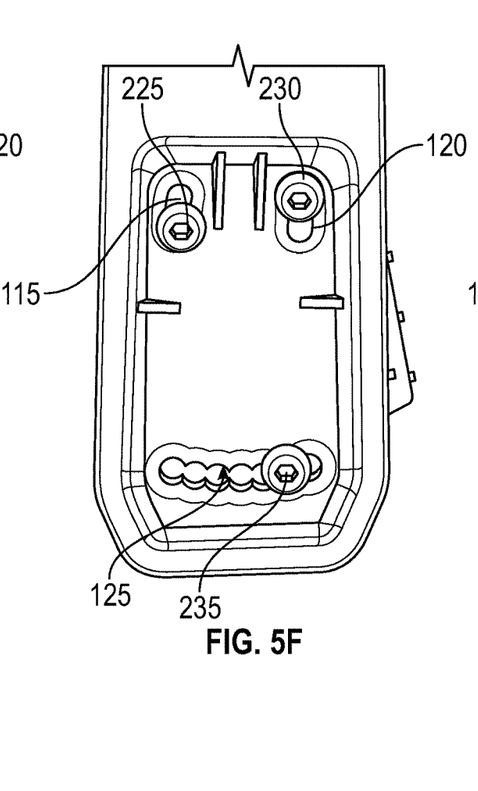

FIG. 5F illustrates a sixth configuration for the fasteners that provides a sixth cant angle. The sixth cant angle is two incremental angles from second axis 145 in the clockwise direction (for example, +10 degrees). In the sixth configuration, third fastener 235 is at two positional slots away from second axis 145 in the clockwise direction. In addition, in the fifth configuration, first fastener 225 is positioned further away from first axis 140 towards the lowest point in first aperture 115 and second fastener 230 is positioned further away from first axis 140 towards the top most point in second aperture 120.

Figure 5G:
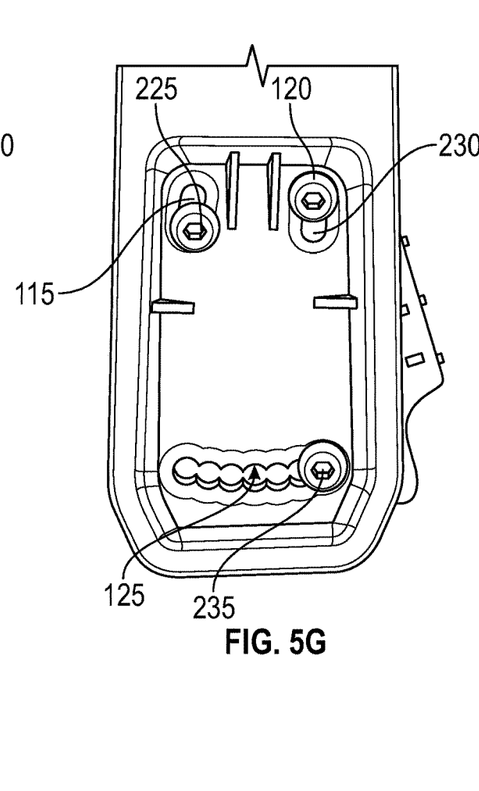

FIG. 5G illustrates a seventh configuration for the fasteners that provides a seventh cant angle. The seventh cant angle is three incremental angles from second axis 145 in the clockwise direction (for example, +15 degrees). In the seventh configuration, third fastener 235 is at three positional slots away from second axis 145 in the clockwise direction. In addition, in the seventh configuration, first fastener 225 is positioned at the lowest point of first aperture 115 and second fastener 230 is positioned at top most point in second aperture 120. Although FIGS. 5A-5G shows seven positional slots in third aperture 125 each providing 5 degrees incremental cant angles with a maximum of 30-degree arc, a different number of positional slots providing different incremental cant angles and a different arc may be provided.

Figure 6:
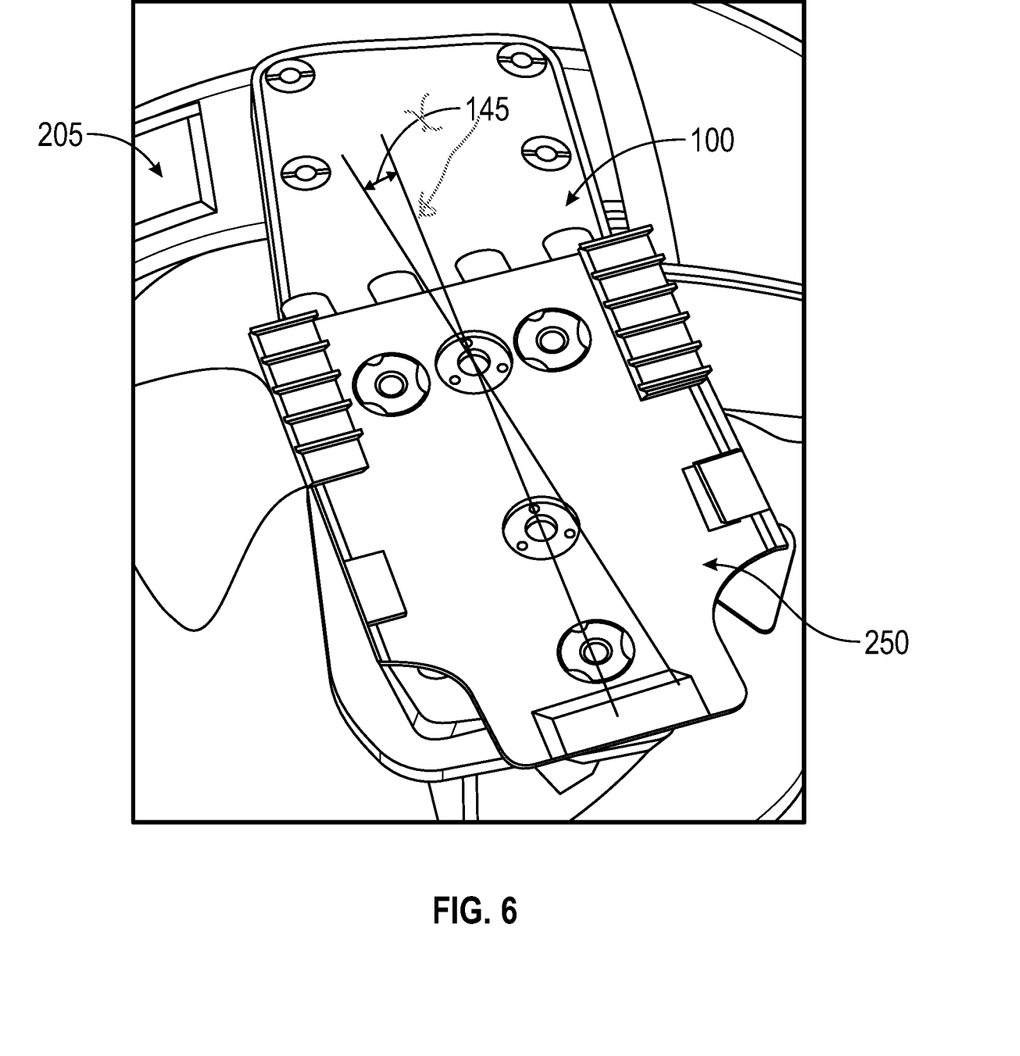
FIG. 6 illustrates the adapter of FIG. 1 connected to a wearable component and an accessory plate connected to the adapter.

FIG. 6 illustrates adapter 100 mounted to a belt 205 and a accessory plate 250 mounted to adapter 100. As shown in FIG. 6, accessory plate 250 is mounted at a cant angle from second axis 145. The cant angle for mounting accessory plate 250 may be determined by the user. In addition, the cant angle may be adjusted after an initial mount.

Figure 7:
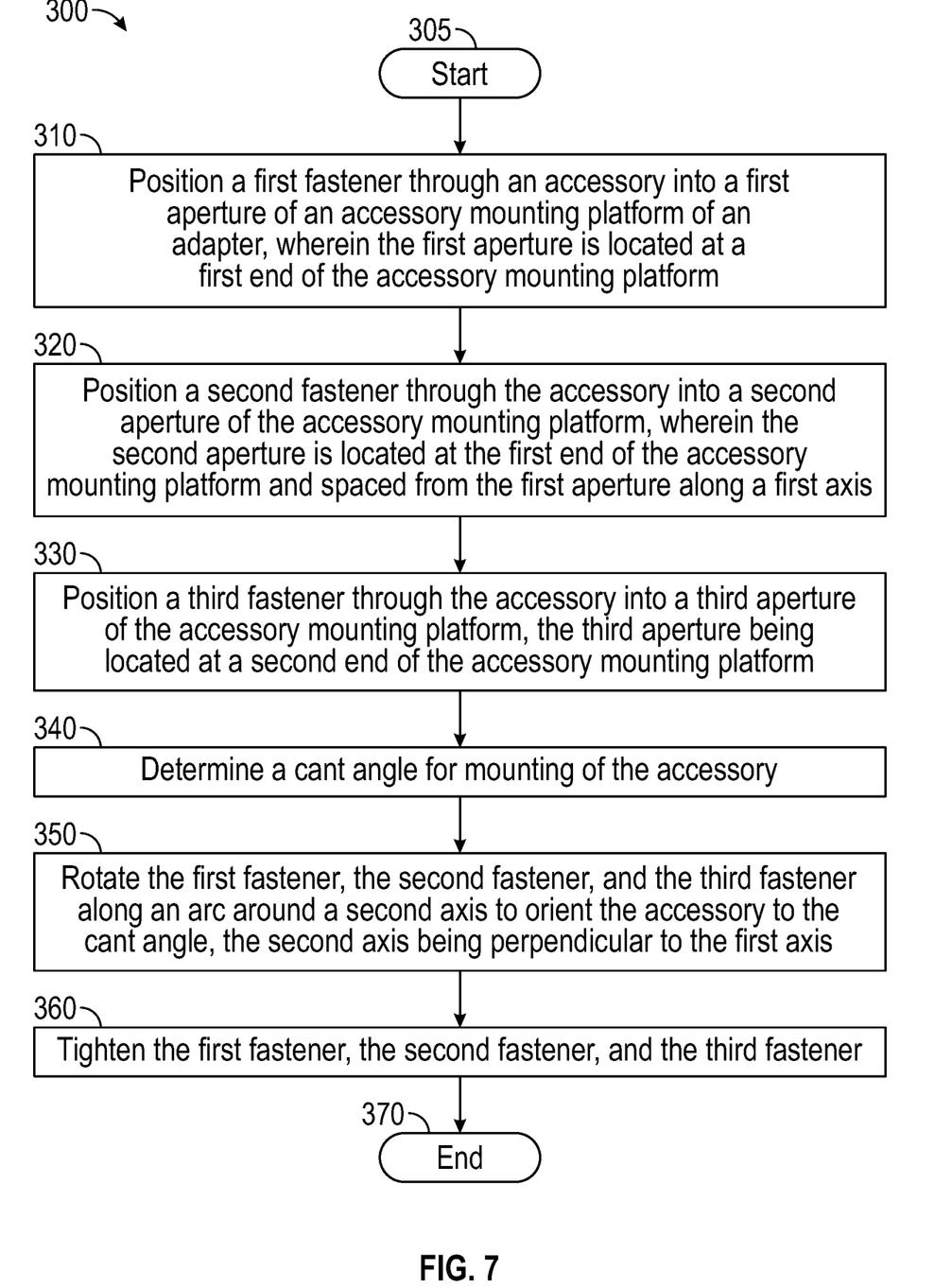
FIG. 7 is a flow diagram illustrating a method of mounting an accessory to adapter of FIG. 1.

FIG. 7 is a flow diagram illustrating a method 300 of mounting a accessory or accessory plate 250 of a accessory to adapter 100. Method 300 may begin at start block 305 and proceed to stage 310 where first fastener 225 is positioned through a accessory into first aperture 115 of accessory mounting platform 110 of adapter 100. First aperture 115 is located at first end 130 of accessory mounting platform 110.

After positioning first fastener 225 through the accessory into first aperture 115 of accessory mounting platform 110 of adapter 100 at stage 310, method 300 may proceed to stage 320 where second fastener 230 is positioned through the accessory into second aperture 120 of accessory mounting platform 110. Second aperture 120 is located at first end 130 of accessory mounting platform 110 and spaced from first aperture 115 along first axis 140.

Once having positioned second fastener 230 through the accessory into second aperture 120 of accessory mounting platform 110 at stage 320, method 300 may proceed to stage 330 where third fastener 235 is positioned through the accessory into third aperture 125 of accessory mounting platform 110. Third aperture 125 is located at second end 135 of accessory mounting platform 110.

After positioning third fastener 235 through the accessory into third aperture 125 of accessory mounting platform 110 of adapter 100 at stage 330, method 300 proceeds to stage 340 where a cant angle for mounting of the accessory is determined. The cant angle may be determined by a user.

Once having determined the cant angle at stage 340, method 300 proceeds to stage 350 where first fastener 225, second fastener 230, and third fastener 235 are rotated along an arc around second axis 145 to the cant angle. After rotating first fastener 225, second fastener 230, and third fastener 235 along the arc around second axis 145 to the cant angle at stage 350, method 300 proceeds to stage 360 where first fastener 225, second fastener 230, and third fastener 235 are tightened. After tightening first fastener 225, second fastener 230, and third fastener 235 at stage 360, method 300 may terminate at end block 370.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. An adapter for attaching an accessory, the adapter comprising:
    a wearable component mounting portion disposed at a first end of the adapter, the wearable component mounting portions comprising a plurality of apertures configured to receive a plurality of fasteners to attach the adapter to a wearable component, the plurality of apertures comprising:
        a first aperture disposed at a first end of the wearable component mounting portion and along a first lateral side of the wearable component mounting portion;
        a second aperture disposed at a second end of the wearable component mounting portion opposite the first end of the wearable component mounting portion and along the first lateral side of the wearable component mounting portion, the second aperture aligned with the first aperture in a direction of a first axis of the adapter and spaced apart from the first aperture in a direction of a second axis of the adapter, the second axis being perpendicular to the first axis;
        a third aperture disposed at the first end of the wearable component mounting portion and along a second lateral side of the wearable component mounting portion opposite the first lateral slide of the wearable component mounting portion, the third aperture spaced apart from the first aperture in the direction of the first axis and aligned with the first aperture in the direction of the second axis; and
        a fourth aperture disposed at the second end of the wearable component mounting portion and along the second lateral side of the wearable component mounting portion, the fourth aperture aligned with the third aperture in the direction of the first axis and spaced apart from the third aperture in the direction of the second axis; and
    an accessory mounting platform disposed at a second end of the adapter opposite the first end of the adapter, the accessory mounting platform comprising:
        a first elongated aperture disposed at a first end of the accessory mounting platform and along a first lateral side of the accessory mounting platform, the first elongated aperture being configured to receive a first fastener and having an arcuate shape;
        a second elongated aperture disposed at the first end of the accessory mounting platform and along a second lateral side of the accessory mounting platform opposite the first lateral side of the accessory mounting platform, the second elongated aperture spaced apart from the first elongated aperture in the direction of the first axis and aligned with the first elongated aperture in the direction of the second axis, and the second elongated aperture being configured to receive a second fastener and having an arcuate shape; and
        a plurality of positional slots disposed at a second end of the accessory mounting platform opposite the first end of the accessory mounting platform and arranged in an arcuate shape having a concave side facing the first end of the accessory mounting platform and symmetric about the second axis, the plurality of positional slots configured to receive a third fastener, wherein the first elongated aperture, the second elongated aperture, and the plurality of positional slots are configured to enable mounting of the accessory at a plurality of cant angles relative to the second axis.

2. The adapter of claim 1, wherein each of the plurality of positional slots is marked with a cant angle.

3. The adapter of claim 1, wherein the first elongated aperture, the second elongated aperture, and the plurality of positional slots are shaped to enable mounting of the accessory at the plurality of incremental cant angles in an arc centered on the second axis.

4. The adapter of claim 1, wherein the accessory mounting platform is configured to provide a separation between a bearer's body and the accessory.

5. The adapter of claim 1, wherein each of the plurality of apertures of the wearable component mounting portion comprises notches that correspond to and mate up with elongated notches on a fastener head.

6. The adapter of claim 1, wherein the plurality of apertures of the wearable component mounting portion comprises a four-screw interface that corresponds to and is compatible with spacing on the wearable component.

7. The adapter of claim 1, wherein the plurality of positional slots comprises one of a first number of positional slots that provides a first set of incremental cant angles over a first arc or a second number of positional slots that provides a second set of incremental cant angles over a second arc.

8. The adapter of claim 1, further comprising embossed markings indicating degrees of deflection fore and aft of zero.

9. The adapter of claim 1, wherein the plurality of positional slots are shaped to prevent rotational slippage of the accessory.

10. The adapter of claim 1, wherein:
    the arcuate shape of the first elongated aperture has a concave side facing the second lateral side of the accessory mounting platform; and
    the arcuate shape of the second elongated aperture has a concave side facing the first lateral side of the accessory mounting platform.

11. An adapter for attaching an accessory, the adapter comprising:
    a wearable component mounting portion disposed at a first end of the adapter, the wearable component mounting portions comprising a plurality of apertures configured to receive a plurality of fasteners to attach the adapter to a wearable component, the plurality of apertures comprising:
        a first aperture disposed at a first end of the wearable component mounting portion and along a first lateral side of the wearable component mounting portion;

a second aperture disposed at a second end of the wearable component mounting portion opposite the first end of the wearable component mounting portion and along the first lateral side of the wearable component mounting portion, the second aperture aligned with the first aperture in a direction of a first axis of the adapter and spaced apart from the first aperture in a direction of a second axis of the adapter, the second axis being perpendicular to the first axis;

a third aperture disposed at the first end of the wearable component mounting portion and along a second lateral side of the wearable component mounting portion opposite the first lateral slide of the wearable component mounting portion, the third aperture spaced apart from the first aperture in the direction of the first axis and aligned with the first aperture in the direction of the second axis; and a fourth aperture disposed at the second end of the wearable component mounting portion and along the second lateral side of the wearable component mounting portion, the fourth aperture aligned with the third aperture in the direction of the first axis and spaced apart from the third aperture in the direction of the second axis; and an accessory mounting platform disposed at a second end of the adapter opposite the first end of the adapter and spaced apart from the wearable component mounting portion in the direction of the second axis, the accessory mounting platform comprising:

a first elongated aperture disposed at a first end of the accessory mounting platform and along a first lateral side of the accessory mounting platform, the first elongated aperture being configured to receive a first fastener and having an arcuate shape;

a second elongated aperture disposed at the first end of the accessory mounting platform and along a second lateral side of the accessory mounting platform opposite the first lateral side of the accessory mounting platform, the second elongated aperture spaced apart from the first elongated aperture in the direction of the first axis and aligned with the first elongated aperture in the direction of the second axis, and the second elongated aperture being configured to receive a second fastener and having an arcuate shape; and a plurality of positional slots disposed at a second end of the accessory mounting platform opposite the first end of the accessory mounting platform and arranged in an arcuate shape having a concave side facing the first end of the accessory mounting platform and symmetric about the second axis, the plurality of positional slots configured to receive a third fastener, wherein the first elongated aperture, the second elongated aperture, and the plurality of positional slots are configured to enable mounting of the accessory at a plurality of cant angles relative to the second axis.

12. The adapter of claim 11, wherein each of the plurality of apertures of the wearable component mounting portion comprises notches that correspond to and mate up with elongated notches on a fastener head.

13. The adapter of claim 11, wherein the plurality of cant angles comprises angles between −30 degrees and +30 degrees.

14. The adapter of claim 11, wherein each of the plurality of positional slots indicates a cant angle of the plurality of cant angles.

15. The adapter of claim 11, wherein each of the plurality of cant angles provides one or more incremental angles for the accessory.

16. The adapter of claim 11, wherein:
the arcuate shape of the first elongated aperture has a concave side facing the second lateral side of the accessory mounting platform; and
the arcuate shape of the second elongated aperture has a concave side facing the first lateral side of the accessory mounting platform.

17. A method of mounting an accessory to a wearable component, the method comprising:
positioning a plurality of fasteners through a plurality of apertures of a wearable component mounting portion of an adapter to attach the adapter to the wearable component, the wearable component mounting portion disposed at a first end of the adapter, and the plurality of apertures comprising:
a first aperture disposed at a first end of the wearable component mounting portion and along a first lateral side of the wearable component mounting portion;
a second aperture disposed at a second end of the wearable component mounting portion opposite the first end of the wearable component mounting portion and along the first lateral side of the wearable component mounting portion, the second aperture aligned with the first aperture in a direction of a first axis of the adapter and spaced apart from the first aperture in a direction of a second axis of the adapter, the second axis being perpendicular to the first axis;
a third aperture disposed at the first end of the wearable component mounting portion and along a second lateral side of the wearable component mounting portion opposite the first lateral slide of the wearable component mounting portion, the third aperture spaced apart from the first aperture in the direction of the first axis and aligned with the first aperture in the direction of the second axis; and
a fourth aperture disposed at the second end of the wearable component mounting portion and along the second lateral side of the wearable component mounting portion, the fourth aperture aligned with the third aperture in the direction of the first axis and spaced apart from the third aperture in the direction of the second axis; and positioning a first fastener through the accessory into a first elongated aperture of an accessory mounting platform of the adapter, wherein the first elongated aperture is disposed at a first end of the accessory mounting platform and along a first lateral side of the accessory mounting platform and has an arcuate shape;

positioning a second fastener through the accessory into a second elongated aperture of the accessory mounting platform, wherein the second elongated aperture is disposed at the first end of the accessory mounting platform and along a second lateral side of the accessory mounting platform opposite the first lateral side of the accessory mounting platform, wherein the second elongated aperture is spaced apart from the first elongated aperture in the direction of the first axis and aligned with the first elongated aperture in the direction of the second axis, and wherein the second elongated aperture has an arcuate shape;

positioning a third fastener through the accessory into one of a plurality of positional slots of the accessory mounting platform, wherein the plurality of positional slots is disposed at a second end of the accessory mounting platform opposite the first end of the accessory mounting platform and arranged in an arcuate shape having a concave side facing the first end of the accessory mounting platform and symmetric about the second axis;

determining a cant angle for mounting of the accessory;

rotating the first fastener, the second fastener, and the third fastener along an arc relative to the second axis to the cant angle; and tightening the first fastener, the second fastener, and the third fastener.

18. The method of claim 17, wherein the first aperture, the second aperture, and the plurality of positional slots are shaped to allow mounting of the accessory at a plurality of positions in the arc around the second axis.

19. The method of claim 17, wherein rotating the first fastener, the second fastener, and the third fastener along the arc relative to the second axis to the cant angle comprises rotating the third fastener to one of the plurality of positional slots corresponding to one of a plurality of cant angles.

20. The method of claim 17, wherein:

the arcuate shape of the first elongated aperture has a concave side facing the second lateral side of the accessory mounting platform; and the arcuate shape of the second elongated aperture has a concave side facing the first lateral side of the accessory mounting platform.

\* \* \* \* \*